3,376,295
PREPARATION OF 3-KETO-Δ⁴-19-NOR STEROIDS
John Siddall, Palo Alto, Calif., assignor to Syntex Corporation, a corporation of Panama
No Drawing. Filed Nov. 1, 1965, Ser. No. 505,975
12 Claims. (Cl. 260—239.55)

This invention relates to a novel method for the preparation of cyclopentanophenanthrene derivatives. It especially relates to a novel hydrolytic rearrangement process by which conjugated unsaturated ketone steroids may be prepared.

The transformation contemplated by this process may be represented by the following equation with only the relevant portions of the molecule represented:

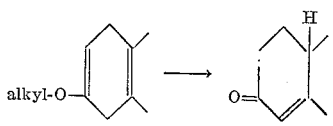

Thus, this invention relates a process which provides steroids containing the useful 3-keto-19-nor-4-ene system, a system which is known to contribute significant physiological properties. One such valuable steroid is 17α-ethynyl-19-nortestosterone which is useful in fertility control and regulation.

Heretofore, the conversion of 3-alkoxy-2,5(10)-diene steroids to the corresponding 3-keto-19-nor-4-ene steroids has been accomplished utilizing, for example, strong mineral acid reagents such as hydrochloric acid but this method suffers from the rearrangement or otherwise manifested destruction or modification of other parts of the steroid molecule, especially acid-labile groups such as ketals, various ether groups such as tetrahydropyranyloxy, and certain arrangements of oxo and hydroxy groups.

Now it has been discovered that by subjecting a 3-alkoxy-2,5(10)-diene steroid to certain strongly basic conditions, followed by contacting the steroid thus obtained with a weak acid, the corresponding 3-keto-19-nor-4-ene steroid can be obtained. The process of the instant invention is particularly applicable to starting steroids containing, besides the 3-alkoxy-2,5(10)-diene system, certain acid-liable or otherwise unstable groups such as ketals, ethers, oxo, hydroxy, and the like, which, by virtue of this invention, are unaffected by the reaction conditions contemplated.

In the practice of this invention, a 3-alkoxy-2,5(10)-diene steroid, e.g. a 3-methoxy-estra-2,5(10)-diene, is converted to a 3-keto-19-nor-4-ene steroid, e.g. a 3-keto-estr-4-ene by, first, the action of strongly basic conditions such as is provided by an alkali metal tert-alkoxide, as for example sodium and potassium tert-butoxide in a nonaqueous, organic solvent, preferably a dipolar, aprotic solvent such as dimethyl sulfoxide, and an inert atmosphere and, secondly, the subsequent action of an aqueous weak acid solution such as an aqueous carboxylic acid solution, notably an aqueous solution of a lower molecular weight carboxylic acid such as acetic acid, butyric acid, oxalic acid, and the like. The product steroid is thereafter recovered and isolated from the reaction mixture following conventional methods.

The base action of this process forms an intermediate conjugated, unsaturated ether in which the alkoxy group at C-3 is terminal to the unsaturated system. In the 9β series of starting steroids this intermediate is the corresponding 3-alkoxy-3,5(10)-diene steroid. Subsequent weak acid action hydrolyzes these intermediate substances to the sought 3-keto-19-nor-4-ene steroids.

The steroids which are useful as starting materials for the instant process include those which contain an alkoxy group at C-3 and are unsaturated between C-2 and C-3 and between C-5 and C-10. The process is thus applicable to steroids of the gonane, 13-alkylgonane, estrane, 19-norpregnane, 19-norcholane, and 19-norcholestane series.

As mentioned hereinbefore, the process herein contemplated is particularly applicable to steroidal compounds containing acid-labile or otherwise unstable substituents in other parts of the molecule such as the C-17 position. Such unstable substituents may be exemplified by methylenedioxy ketals, ethylenedioxy ketals, ethylene or methylenethio ketals, ethylene or methylenethiooxy ketals, bis-methylenedioxy ketals, various ethers such as tetrahydropyranyloxy and also bis-ethers, and certain arrangements of oxo and hydroxy groups as well as others which are known to be unstable or at least sensitive groups, especially when such substituents are substituted in the C-17 position.

One group of useful starting steroids may be typified by a compound selected from the estrane series such as 3-alkoxy-estra-2,5(10)-diene. This particular starting steroid is obtainable via a Birch reduction of the corresponding 3-alkoxy-estra-1,3,5(10)-triene. Compounds within the useable class designated may be obtained via other routes as well.

Strong base action to which the starting steroid is subjected may be characterized by being provided by a base which has a pKa value greater than 14 and preferably greater than 17, in a nonaqueous, organic solvent. One class of such bases are the metal alcoholates (or alkoxides), preferably the alkali metal alcoholates. Branched chain alcohols including isopropyl alcohol are preferred, particularly the tertiary alcohols such as tert-butyl, tert-amyl, and tert-hexyl alcohols. Potassium tert-butoxide works admirably well. Also useful as strong bases are the metal amides and hydrides such as sodium and potassium amides and hydrides. Other useful strong bases may be provided from metals (usually alkali metals) and the anions from such compounds as hydrocarbon sulfoxides, e.g. dimethyl sulfoxide, hydrocarbon amides, e.g. dimethylformamide, and the like.

The basicity can be enhanced and the process thereby favored when the chosen strong base is used with a dipolar, aprotic solvent. Such a solvent does not carry an acidic hydrogen and does not require the loss of a proton for its solvent function. Typical examples of dipolar, aprotic solvents which are useful in this embodiment are dimethyl sulfoxide, dimethylformamide, and the like.

Thus, the preferred strong base action is provided by a base having a pKa value upwards of 17 or more when used in conjunction with a dipolar, aprotic solvent. One such strong base combination is provided by potassium tert-butoxide in dimethyl sulfoxide solvent. Another useful combination is provided by a metal such as potassium or a metal hydride such as sodium hydride and excess dimethyl sulfoxide whereby the excess dimethyl sulfoxide serves as solvent to enhance the basicity of the metal methyl sulfinyl carbanion (dimethyl sulfoxonium methylide) base.

The steroid obtained from the base-treated starting material is then contacted with an aqueous weak acid solution, as described hereinbefore. Generally, a carboxylic acid and preferably a lower molecular weight carboxylic acid is used. Thus, monocarboxylic acids and dicarboxylic acids such as formic, acetic, propionic, butyric, oxalic, malonic, and succinic acids are preferred.

Strong base, as exemplified hereinbefore, may be used within wide concentration limits. The reaction readily follows when from 0.05 mole to 15 moles and, preferably, from 0.9 mole to 5.0 moles of strong base per mole of starting steroid is used.

Solvent used in the base reaction, whether of that type useful to enhance the basicity of the system or otherwise, may be used in variable quantities. The minimum amount necessary is that required to solubilize the reactants at the temperature employed. Excesses may be used but are not necessary.

Very minimal quantities of weak acid are sufficient to further induce the contemplated conversion after the base treatment and yet leave acid-labile or otherwise unstable substituents unaffected and intact. Mild acid solution comprised of as little as 0.001 percent by weight weak acid in aqueous, organic solvent such as aqueous methanol and tetrahydrofuran will suffice. Amounts of acid (in aqueous solution) upwards of 5.0 percent by weight or more are tolerable. One particularly useful concentration range is 0.5 to 1.0 percent by weight weak acid in aqueous, organic solvent.

Temperatures of from −20° C. to 150° C. or more are operative in the process contemplated. Temperatures below −20° C. may be used but undue lengths of time may be required for the reaction and special equipment may be needed to maintain the reaction mixture liquid. Temperatures of above 75° C. are also useful but are generally unnecessary to sustain the reaction. Ambient (room) temperatures, usually from about 15° C. to 30° C., are preferred. Atmospheric pressure is satisfactory. Reaction occurs at 25° C. after about 30 minutes and it can be extended to any length of time desired without serious consequence. Optimum reaction duration depends upon the particular reactants and the temperature employed therewith.

The following examples illustrate the manner by which this invention may be practiced. It is not intended, however, that the scope of the invention be limited to the details thereof.

Example 1

A mixture of 2.07 g. of 3-methoxy-pregna-1,3,5(10)-trien-17α-ol-20-one in 100 ml. of benzene is refluxed with 5.20 ml. of ethylene glycol for 15 hours. The reaction mixture is washed with a dilute, aqueous sodium bicarbonate solution and then water, dried over sodium sulfate, and evaporated until crystals appear. The product, 3-methoxy - 20,20 - ethylenedioxy - 19 - nor - pregna - 1,3,5(10)-trien-17α-ol is recrystallized from ether-hexane.

Example 2

To a cooled solution of 2.31 g. of the product obtained by the procedure of Example 1 in 270 ml. of tetrahydrofuran is added, with stirring, 3.2 g. lithium metal is small pieces over a 10-minute period. The ammonia is then allowed to evaporate and water is added to the residue. The product is extracted with ether, is washed four times with water, and is dried to yield 3-methoxy-20,20-ethylenedioxy - 19 - norpregna - 2,5(10) - diene - 17α - ol which is further purified by recrystallization from ether-methanol.

Example 3

To a solution of 5.8 g. of potassium tert-butoxide in 235 g. of dimethyl sulfoxide is added 11.2 g. of the product obtained by the procedure of Example 2. The mixture is shaken for 6 hours in an argon atmosphere at room temperature. After this time, the mixture is poured into 1250 ml. of water, the organic portion is extracted with ether, and a solid is recrystallized which is further purified by recrystallization from dry methanol.

A 1 g. portion of this solid substance is added to 30 ml. of tetrahydrofuran. To this solution is added 0.3 g. oxalic acid monohydrate in 10 ml. of water and the whole mixture is stirred for 20 minutes. The mixture is allowed to stand at room temperature for 16 hours and it is then poured into a dilute, aqueous potassium bicarbonate solution. The product, 20,20-ethylenedioxy-19-norpregn-4-en-17α-ol-3-one, is thereafter extracted with ether and purified by repeated recrystallization from ether.

Example 4

The procedure of the first paragraph of Example 3 is repeated utilizing as a starting steroid, 3-methoxy-20,20 - ethylenedioxy - 19 - nor - 9β - pregna - 2,5(10) - dien-17α-ol. After the base treatment, 3-methoxy-20,20-ethylenedioxy - 19 - nor - 9β - pregna - 3,5(10) - dien-17α-ol is formed. This compound is treated following the procedure of the second paragraph of Example 3, to yield 20,20 - ethylenedioxy - 19 - nor - 9β - pregn - 4 - en-ol-3-one.

Example 5

The procedure of Example 3 is repeated using in lieu of potassium tert-butoxide, 2.0 g. potassium metal, with similar results.

Example 6

The procedure of Example 3 is repeated substituting sodium amide in dimethylformamide for potassium tert-butoxide in dimethyl sulfoxide, with similar results.

Example 7

The procedure of Example 3 is repeated using a 1 percent solution of acetic acid in aqueous methanol in lieu of the use of tetrahydrofuran and oxalic cid monohydrate in water to yield the product.

Example 8

The compounds listed under I below are treated according to the procedure of Example 3 to give the corresponding products specified under II below:

| I | II |
|---|---|
| 3-methoxyestra-2,5(10)-dien-17β-ol | Estr-4-en-17β-ol-3-one. |
| 3-methoxy-17,17-ethylenedioxyestra-2,5(10)-diene. | 17,17-ethylenedioxyestr-4-en-3-one. |
| 3-methoxy-17α-ethylestra-2,5(10)-dien-17β-ol. | 17α-ethylestr-4-en-17β-ol-3-one. |
| 3-methoxy-17α-ethyl-18-methyl-estra-2,5(10)-dien-17β-ol. | 17α-ethyl-18-methylestr-4-en-17β-ol-3-one. |
| 3-methoxy-17α-vinylestra-2,5(10)-dien-17β-ol. | 17α-vinylestr-4-en-17β-ol-3-one. |
| 3-methoxy-17α-ethynylestra-2,5(10)-dien-17β-ol. | 17α-ethynylestr-4-en-17β-ol-3-one. |
| 3-methoxy-17α-chloroethynylestra-2,5(10)-dien-17β-ol. | 17α-chloroethynylestr-4-en-17β-ol-3-one. |
| 3,17,17-trimethoxyestra-2,5(10)-diene. | 17,17-dimethoxyestr-4-en-3-one. |
| 3-methoxy-17,17-diethoxyestra-2,5(10)-diene. | 17,17-diethoxyestr-4-en-3-one. |
| 3-methoxy-20,20-ethylenedioxy-19-norpregna-2,5(10)-diene. | 20,20-ethylenedioxy-19-nor-pregn-4-en-3-one. |
| 3-methoxy-16-methyl-20,20-ethylenedioxy-19-norpregna-2,5(10)-diene-11,17,α,21-triol. | 16-methyl-20,20-ethylenedioxy-19-norpregn-4-ene-11,17α,21-triol-3-one. |

Other 3-alkoxy-2,5(10)-dienes may be converted to the corresponding 3-keto-4-ene steroids via a totally analogous procedure as that given above.

What is claimed is:
1. A method of forming a 3-keto-19-nor-4-ene steroid containing acid labile groups which comprises treating a 3-alkoxy-2,5(10)-diene steroid containing said acid labile groups with a strong base and thereafter contacting the steroid thus obtained with an aqueous solution containing from 0.001% to 5.0% by weight of a lower molecular weight carboxylic acid.
2. The method of claim 1 wherein the strong base is provided by an alkali metal alcoholate.
3. The method of claim 1 wherein the strong base is provided by an alkali metal alcoholate in a dipolar, aprotic solvent.
4. The method of claim 1 wherein the strong base is provided by potassium tert-butoxide in dimethyl sulfoxide solvent.
5. A method of forming a 3-keto-19-nor-4-ene steroid containing acid labile groups which comprises treating a 3-alkoxy-2,5(10)-diene steroid containing said acid labile groups with potassium tert-butoxide in dimethyl sulfoxide solvent and thereafter contacting the steroid thus obtained with an aqueous solution containing from 0.001% to 5.0% by weight of oxalic acid.

6. The method of claim 5 wherein the starting steroid is 3-methoxy - 17,17 - ethylenedioxyestra - 2,5(10)-diene whereby to form 17,17-ethylenedioxyestr-4-en-3-one.

7. The method of claim 5 wherein the starting steroid is 3,17,17-trimethoxyestra-2,5(10)-diene whereby to form 17,17-dimethoxyestr-4-en-3-one.

8. The method of claim 5 wherein the starting steroid is 3-methoxy-17,17-diethoxyestra-2,5(10)-diene whereby to form 17,17-diethoxyestr-4-en-3-one.

9. The method of claim 5 wherein the starting steroid is 3-methoxy-20,20-ethylenedioxy-19-norpregna-2,5(10)-diene whereby to form 20,20-ethylenedioxy-19-norpregn-4-en-3-one.

10. The method of claim 5 wherein the starting steroid is 3-methoxy-16-methyl-20,20 - ethylenedioxy-19-norpregna-2,5(10)-diene-11,17α,21-triol whereby to form 16-methyl - 20,20 - ethylenedioxy-19-norpregn-4-ene-11,17α,21-triol-3-one.

11. The method of claim 5 wherein the starting steroid is 3-methoxy-20,20-ethylenedioxy-19-norpregna-2,5(10)-dien-17α-ol whereby to form 20,20-ethylenedioxy-19-norpregn-4-en-17α-ol-3-one.

12. The method of claim 5 wherein the starting steroid is 3-methoxy-20,20 - ethylenedioxy - 19-nor-9β-pregna-2,5(10)-dien-17α-ol whereby to form 20,20-ethylenedioxy-19-nor-9β-pregn-4-en-17α-ol-3-one.

References Cited

UNITED STATES PATENTS

| | | | |
|---|---|---|---|
| 2,913,456 | 11/1959 | Magerlein | 260—239.55 |
| 3,076,826 | 2/1963 | Clinton et al. | 260—397.5 |
| 3,271,427 | 9/1966 | Petrow et al. | 260—397.5 |

OTHER REFERENCES

Antonucci et al., J. Org. Chem. 17, 1369–1374 (1952), QD 241.J6 (pp. 1369, 1372 and 1373 relied upon).

Biegel et al., J. Org. Chem. 16, 1610–1614 (1951), QD 241.J6.

Birch et al., J. Chem Soc., 4234–4237 (1963), QD 1 C6.

LEWIS GOTTS, *Primary Examiner.*

E. L. ROBERTS, *Examiner.*

T. M. NESHBESHER, *Assistant Examiner.*